United States Patent [19]

Bay et al.

[11] Patent Number: 5,372,297
[45] Date of Patent: Dec. 13, 1994

[54] DRUM CATHODE FOR USE IN THE PRODUCTION OF METAL FOILS AND A METHOD OF PRODUCING THE SAME

[75] Inventors: Adam G. Bay, Chesterland; Jamie H. Chamberlain, Concord; Shiuh-Kao Chiang, Solon, all of Ohio

[73] Assignee: Gould Electronics Inc., Eastlake, Ohio

[21] Appl. No.: 56,186

[22] Filed: May 3, 1993

Related U.S. Application Data

[62] Division of Ser. No. 861,553, Apr. 1, 1992, Pat. No. 5,240,582.

[51] Int. Cl.$^5$ ............................................. B23K 35/32
[52] U.S. Cl. ................................... 228/125; 228/231; 228/262.71; 219/128; 219/137 WM
[58] Field of Search ............... 228/125, 263.21, 231, 228/151, 262.71; 219/128, 136, 137 WM

[56] References Cited

U.S. PATENT DOCUMENTS

| | | | |
|---|---|---|---|
| 2,025,922 | 12/1935 | Weinrich | 228/125 X |
| 3,025,816 | 3/1962 | McCoy | 219/128 |
| 4,476,370 | 10/1984 | Kakihara | 228/125 X |
| 4,491,001 | 1/1985 | Yoshida et al. | 228/125 |
| 5,017,271 | 5/1991 | Whewell et al. | 204/15 |
| 5,207,371 | 5/1993 | Prinz et al. | 228/125 |

FOREIGN PATENT DOCUMENTS 690691 4/1953 United Kingdom .
527273 5/1977 U.S.S.R. .

OTHER PUBLICATIONS

ASM Handbook, 9th Edition, Titanium, pp. 353-361, 368-373, 378-381, 408-411 and 414-415.

*Primary Examiner*—Kenneth J. Ramsey
*Attorney, Agent, or Firm*—Benesch, Friedlander, Coplan & Aronoff

[57] ABSTRACT

The present invention provides a new and improved titanium metal drum cathode for use in the production of metal foils and a novel method of making the same. The method includes the steps of welding together the ends of a strip of titanium that has been roll formed into a cylinder. During the welding operation some of the weld beads that form the weld are hot peened immediately upon solidification. Upon complete formation of the weld, the formed and welded trip of titanium is subjected to a heat treating cycle that includes a double anneal. Preferably, the strip of titanium metal and the weld metal that is used to form the weld both comprise an addition agent such as yttria.

24 Claims, 3 Drawing Sheets

DRUM CATHODE FOR USE IN THE PRODUCTION OF METAL FOILS AND A METHOD OF PRODUCING THE SAME

This is a divisional of copending application(s) Ser. No. 07/861,553 filed on Apr. 1, 1992 now U.S. Pat. No. 5,240,582.

TECHNICAL FIELD OF THE INVENTION

This invention relates to a new and improved method of joining two or more sections of titanium metal. The inventive method is particularly well adapted for use in the fabrication of cathodes which are used in the production of metal foils. More particularly, the invention provides an improved drum cathode comprising titanium metal containing a grain refiner or dispersion strengthener such as preferably yttria and a novel method of making such drum cathode.

BACKGROUND OF THE INVENTION

Most electronic devices such as, for example, computers, televisions, radio receivers and amplifiers include electronic circuits formed by printed circuit boards. The art of printed circuit board fabrication which arose from the efforts of Strong et al., as disclosed in British Patent No. 690,691, has had a profound impact upon modern society. Ever since the initial efforts by Strong et al. it has been an ongoing goal of the printed circuit board industry to increase the number of electrical circuit components which can be provided on a given circuit board surface area. While pursuing this goal various new and improved methods of producing printed circuit boards have developed since the efforts of Strong et al. such as, for example, the meritorious methods disclosed in Whewell et al., U.S. Pat. No. 5,017,271 which is owned by Gould Inc.

In the manufacture of printed circuit boards, raw materials, including conductive foils, which are usually copper foils, and dielectric supports comprising organic resins and suitable reinforcements, are packaged together and processed under temperature and pressure conditions to produce products known as laminates. The laminates are then used in the manufacture of printed circuit boards. Generally, the laminates are processed by etching away portions of the conductive foil from the laminate surface to leave a distinct pattern of conductive lines and formed elements on the surface of the etched laminate. Laminates and/or laminate materials may then be packaged together with etched products to form multilayer circuit board packages. Additional processing, such as, for example, hole drilling and component attaching, will eventually complete the printed circuit board product.

The printed circuit board industry's push toward miniaturization and increased performance per package is resulting in conductors of ever smaller widths, more closely spaced on thinner substrates. The characteristics of the copper foil have a significant effect on the electrical performance of the finished printed circuit board. For example, a foil used in multilayer laminates must not crack during hole drilling. Also, foils which are less susceptible to wrinkling during the lamination process are preferable for reducing scrap losses. Similarly, and more importantly, variations in the thickness or surface texture of the copper foil will result in unpredictable electrical characteristics for any given printed circuit board.

Copper foils have been produced for printed circuit boards by two major methods, rolling or electrodeposition. The production of copper foil by electrodeposition processes involves the use of an electroforming cell (EFC) consisting of an anode and a cathode, an electrolyte bath solution, generally containing copper sulphate and sulphuric acid, and a source of current at a suitable potential. When voltage is applied between the anode and cathode, copper deposits on the cathode surface.

The process begins by forming the electrolyte solution, generally by dissolving (or digesting) a metallic copper feed stock in acid. After the copper is dissolved the solution is subjected to an intensive purification process to ensure that the electrodeposited foil contains no disruptions and/or discontinuities. Various agents for controlling the properties may be added to the solution.

The solution is pumped into the EFC and when voltage is applied between the anode and cathode, electrodeposition of copper occurs at the cathode. Typically, the process involves the use of rotatable cylindrical cathodes ("drum cathodes") that may be of various diameters and widths. The electrodeposited foil is then removed from the drum cathodes as a continuous web as the drum cathode rotates. Copper foils prepared using such conventional electrodeposition methodology have a smoother (drum) side and a rough or matte (copper deposit growth front) side.

In order to produce a foil of uniform thickness and surface finish, it is imperative that the plating surface of the drum cathode be uniform and consistent. More particularly, the quality and characteristics of the metal foils are a function of the quality of the plating surface of the drum cathode. In order to obtain a uniform matte finish the plating surface must exhibit uniform hardness and be free of surface defects and blemishes. Further, in order to maintain a suitable finish during use, the plating surface must exhibit a suitable degree of hardness.

Drum cathodes for use in producing copper metal foil have heretofore generally been manufactured using either stainless steel or ASTM Grade 7 titanium. ASTM Grade 7 titanium comprises 0.2 weight percent palladium (Pd). Titanium is generally preferred for in some applications it obviates certain environmental concerns. However, one major downside associated with a titanium anode is cost or unsatisfactory performance. More particularly, many prior art titanium drum cathodes are produced in a seamless or unitary form (i.e., a single continuous piece, no joining or welding) so as to afford a uniform matte finish along the outer diameter of the drum cathode. Unfortunately, the equipment which is required to form a seamless titanium drum cathode is quite expensive and the end result is a costly drum cathode. Alternatively, some prior art titanium drum cathodes are produced by forming a strip of titanium into a cylinder and welding together the ends. However, many of these drum cathodes do not provide a long lasting uniform matte finish free of defects and blemishes. More particularly, during use the weld zone begins to leave its mark or shadow on the metal foil thus necessitating more frequent replacement of such drum cathode as compared to a seamless drum cathode. Therefore, it is believed that if a method could be developed which would allow one to weld together a length .of titanium so as to provide a drum cathode that affords a long lasting uniform matte finish free of defects and blemishes, thereby eliminating the need for costly seamless production equipment and the expenses associated with the frequent replacement of prior art welded drum cathodes, considerable costs could be saved.

SUMMARY OF THE INVENTION

The present invention provides a new and improved non-seamless type method of producing a titanium drum cathode which substantially eliminates traces of the weld zone and affords a uniform matte finish free of surface defects and blemishes along the entire plating surface of the drum. The invention further provides a cathode drum of increased hardness that affords a longer lasting finish on the drum plating surface which in turn increases productivity and reduces processing expenses. Additionally, a drum cathode made in accordance with the principles of the present invention can be produced at considerably lower costs than a seamless drum cathode for there is no need for the expensive capital equipment that is employed in the production of seamless drum cathodes.

In one preferred embodiment the invention provides a method of fabricating a drum cathode for use in producing electroformed copper foil comprising the steps of providing a first section of titanium metal, providing a second section of titanium metal and joining such first section of titanium metal to such second section of titanium metal with a weld filler metal. The first section of titanium metal and the second section preferably comprise a single piece of titanium metal. Preferably, the weld filler metal and the single piece of titanium metal comprise a grain refiner or dispersion strengthener. More preferably, both the weld filler metal and the single piece of titanium metal comprise about 0.4 percent by weight yttrium oxide (yttria) $Y_2O_3$. As used herein the specification and the claims below, the term "titanium metal," unless otherwise specified, encompasses both alloyed titanium and unalloyed titanium.

During the joining step multiple layers or beads of molten weld filler metal are deposited utilizing a suitable welding technique. Immediately subsequent to the solidification of the weld metal or bead, at a temperature of about 1500° C., the solidified weld metal is hot peened so as to impart to the bead at least about a 60 percent reduction in the height of the bead. Subsequent to the joining operation, at least a portion of such joined section of titanium metal is annealed by heating it to a temperature of from about 982° C. for a period of about 30 minutes.

After the heating step, the joined section of titanium metal is preferably furnace cooled. Then, it is subjected to a second anneal by heating it to a temperature of about 815° C. for about 15 minutes followed by furnace cooling. Unless otherwise specified, all temperatures provided herein the specification and the claims below are equilibrium temperatures (i.e., a substantially constant temperature throughout the piece or section of material being heated, cooled or held at temperature).

These and other aspects of the present invention will become clear to those skilled in the art upon the reading and understanding of the specification, drawings and claims below.

BRIEF DESCRIPTION OF THE DRAWINGS

Referring to the annexed drawings.

DETAILED DESCRIPTION OF THE INVENTION

Figure 1:
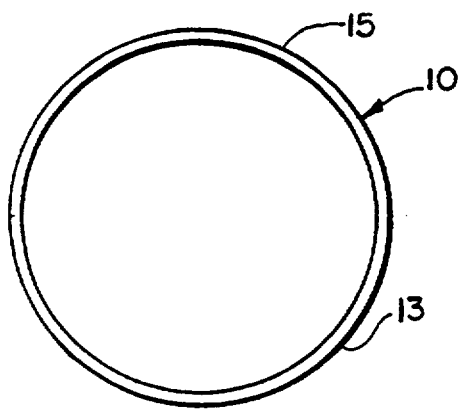
FIG. 1 is a side view of a drum cathode made in accordance with the principles of the present invention.
Figure 2:
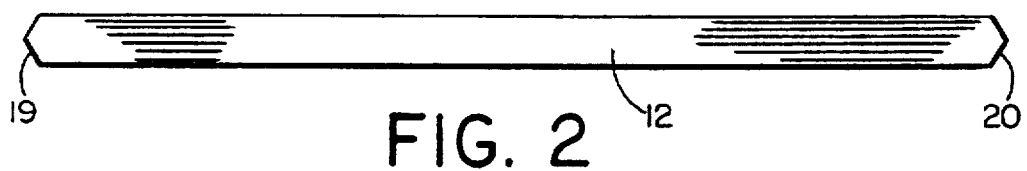
FIG. 2 is a side view of a length or strip of titanium metal for use in producing the drum cathode of FIG. 1.

Referring to the drawings, and initially to FIG. 1, there is shown a titanium drum cathode 10 made in accordance with the principles of the present invention. Cathode 10 is formed by joining the ends of a strip 12 of titanium metal as shown in FIG. 2. Cathode 10 includes a plating surface 13 which displays a uniform matte blemish-free finish throughout, even in the area of the weld 15 which is produced when the ends of a section or strip of titanium strip 12 are joined. More particularly, cathode 10 is produced by first taking a rectangular section or strip 12 of titanium metal and roll forming it into a cylinder, such that the distal ends 19 and 20 are in close proximity, and then the ends 19 and 20 are joined using the novel techniques developed by applicants.

The strip 12 comprises a grain refiner or dispersion strengthener (i.e., addition agent) such as yttrium (Y). As used herein the specification and the claims below the term "addition agent" means any compound or material that is added to the titanium metal for the purposes of refining the grain size during the hot peening operation discussed below or strengthening the resultant weld formed during the joining operation discussed below. The yttrium is probably present in the titanium in the oxide form. Thus, preferably, the strip 12 comprises from about 0.001 weight percent to about 0.10 weight percent yttria. More preferably, the strip 12 comprises 0.01 weight percent to about 0.07 weight percent yttria. Most preferably, the titanium metal of strip 12 comprises about 0.04 percent by weight yttria. Similarly, the titanium metal weld rod or weld metal utilized to produce the weld that joins the ends 19 and 20 comprises an addition agent such as yttrium. Once again, the yttrium is probably present in the oxide form. Thus, preferably the titanium metal weld rod comprises from about 0.001 weight percent to about 0.10 weight percent yttria. More preferably, the titanium metal weld rod comprises from about 0.01 weight percent to about 0.07 weight percent yttria. Most preferably, the titanium metal weld rod comprises about 0.04 weight percent yttria.

Figure 3A:
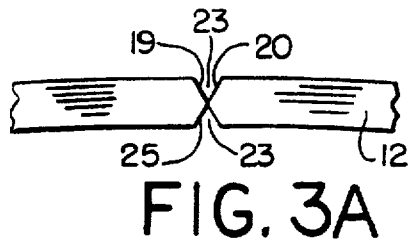
FIG. 3A is a fragmentary side view of the ends of the length of titanium metal of FIG. 2 prior to the welding operation.
Figure 3B:
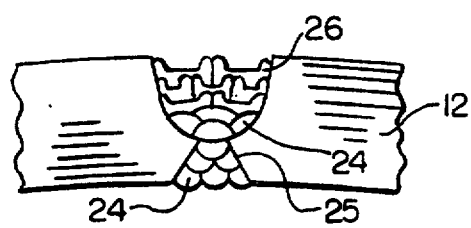
FIG. 3B is a fragmentary schematic side view of the ends of the length of titanium metal of FIG. 2 during the welding operation.

Weld 15 is formed by first providing the ends 19 and 20 of the strip 12 with a pointed bevel of about 20° as best seen in FIG. 3A so as to provide a pair of weld grooves 23 with angles of about 40°. Using any one of a number of conventional welding techniques, multiple beads 24 of weld metal using a titanium metal weld rod are then deposited along the inner groove 25 until such groove is welded shut. Then, a J-weld groove 26 having a groove angle of about 60° is machined along the outer edge (plating surface) of the formed and welded strip as shown in FIG. 3B. Then, multiple beads 24 of weld metal are deposited. After the first few beads 24 are deposited, then immediately upon solidification of each successive weld bead 24, while such beads 24 are "red hot," they are hot peened while the beads 24 are at a temperature of from about 1450° C. to about 1670° C. The hot peening step serves to work the weld beads 24 and promote the formation of a fine grain structure. Preferably, during hot peening the weld beads 24 are at a temperature of from about 1475° C. to about 1600° C., and more preferably about 1500° C.

Figure 4A:
FIG. 4A is a blown-up schematic cross-sectional view of one of the weld beads of FIG. 3 prior to hot peening.
Figure 4B:
FIG. 4B is a schematic cross-sectional view of the weld bead of FIG. 4A subsequent to hot peening.

Referring now to FIG. 4A there is schematically shown a weld bead 24 immediately subsequent to solidification. Shown in FIG. 4B is the bead 24 subsequent to hot peening. Note that during such hot peening the bead 24 is sufficiently soft that the areas 28 beyond the face of the hammer used to stroke the beads 24 appear to flow slightly upwardly. During the hot peening step, at least a 5 percent reduction in height is imparted to the weld bead 24. Preferably, from about a 20 percent to about a 80 percent reduction in height is imparted to the weld bead 24 and more preferably, about a 60 percent reduction in height is imparted.

Preferably, the weld beads 24 are formed using a TIG (tungsten inert gas) welder. However, it will be appreciated that any number of welding techniques may be used such as, for example, plasma-arc welding, laser welding, MIG (metal inert gas) welding, shielded or submerged electric arc welding, gas welding and electron beam welding.

Figure 5:
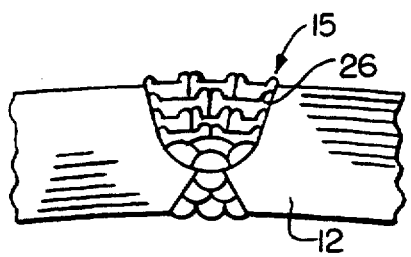
FIG. 5 is a side view of the ends of the length of titanium alloy of FIG. 2 upon completion of the welding operation.

Once the weld beads 24 have been built up slightly above the level of the groove 26 as show in FIG. 5, the formed strip 12 is subjected to a heat treating cycle. The heat treating cycle comprises a double anneal. Specifically, the heat treating cycle comprises annealing the formed and welded strip 12 at a temperature of from about 940° C. to about 1024° C. for a period of from about 5 minutes to about 60 minutes. Preferably, the formed and welded strip 12 is annealed at a temperature of from about 968° C. to about 995° C. for a period of from about 10 minutes to about 50 minutes. More preferably, formed and welded strip 12 is annealed at a temperature of about 982° C. for a period of about 25 minutes.

Subsequent to annealing, formed and welded strip 12 is then slow cooled (furnace cooled) at a rate of from about 3° C./minute to about 15° C./minutes. Preferably, formed and welded strip 12 is slow cooled at a rate of from about 3° C./minute to about 6° C./minute. More preferably, formed and welded strip 12 is slow cooled at a rate of about 5° C./minute.

Formed and welded strip 12 is then subjected to a second anneal at a temperature of from about 774° C. to about 857° C. for about from 5 minutes to about 60 minutes. Preferably, the second anneal comprises heating from about 788° C. to about 843° C. for about 10 to about 30 minutes. More preferably the second anneal comprises heating to about 815° C. for about 15 minutes.

After the second anneal, formed and welded strip 12 is then furnace cooled as set forth above. After furnace cooling, formed and welded strip 12 is then machined along the outer surface to form a true and round drum cathode with the appropriate matte finish.

Figure 6A:
FIGS. 6A, 6B and 6C are photomicrographs taken at 50× showing in transverse cross-section (side view) a piece of titanium metal joined together in accordance with the principles of the present invention in the weld area, the area immediately adjacent the weld area and the base metal respectively.
Figure 6B:
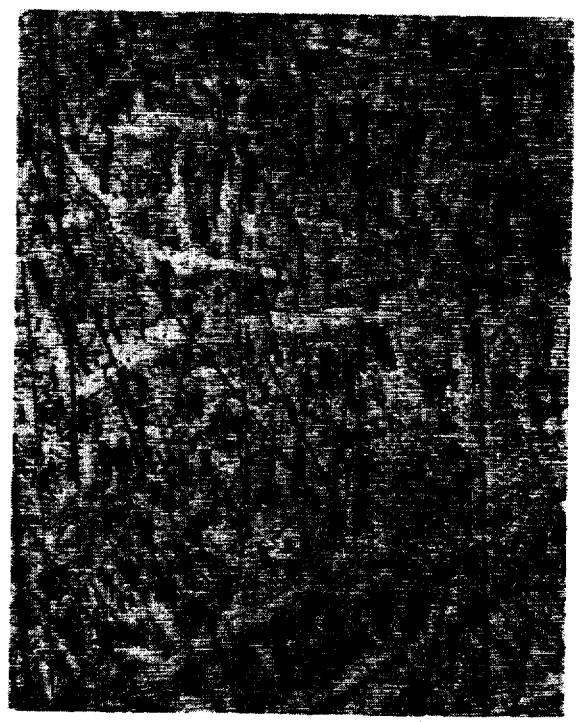
Figure 6C:
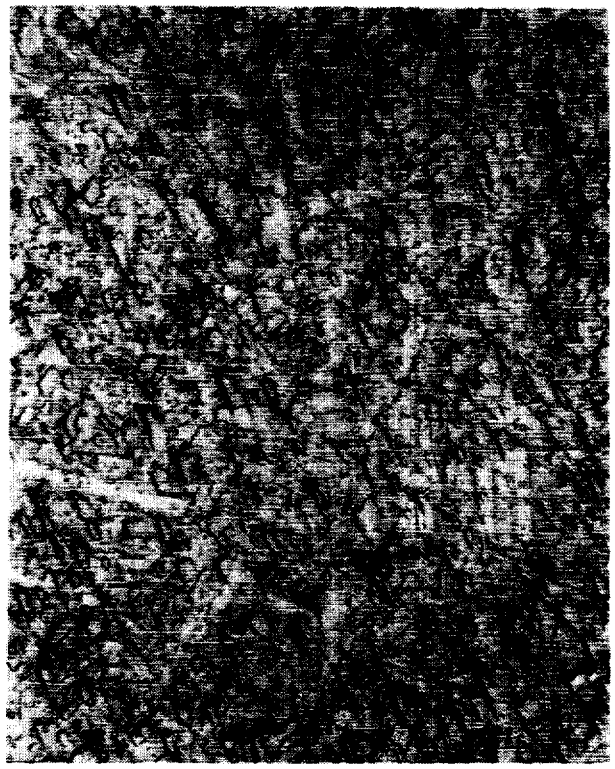

A weld prepared in accordance with the teachings of applicants' invention is shown in the photomicrographs of FIG. 6. As shown in the photomicrographs, applicants' novel joining technique results in a substantially uniform grain structure across the weld and particularly in the area of the weld as shown in FIG. 6A, the area immediately adjacent to the weld as shown in FIG. 6B and the base metal as shown in FIG. 6C. Thus, as seen in the photomicrographs there is substantially no heat affected zone.

The following example will serve to further illustrate the novel features and advantages of the present invention. While this example will show one skilled in the art how to operate within the scope of this invention, it is not to serve as a limitation on the scope of the invention for such scope is only defined in the claims below.

EXAMPLE

A strip of titanium metal comprising 0.04 weight percent yttria is provided. The strip measures about 370 inches in length, about 8 inches in width and has a thickness of about 0.50 inches. The strip is a standard commercial unalloyed titanium product provided in the as hot rolled condition and having 0.05 maximum nitrogen (N), 0.10 maximum carbon (C), 0.015 maximum hydrogen (H), 0.50 maximum iron (Fe) and 0.40 maximum oxygen ($O^2$).

The distal ends of the strip are machined to provide a pointed beveled edge like that shown in FIG. 2. The strip is then roll formed into a cylinder such that the ends of the strip are in aligned contact as shown in FIG. 3. A 0.0625 inch diameter titanium metal weld rod comprising about 0.04 weight percent yttria is then provided. Utilizing a TIG welder and standard or conventional titanium welding techniques successive weld beads are deposited with the weld rod to close the inner groove formed by the beveled ends of the strip. The outer groove is then machined to provide a J-groove as shown in FIG. 3B. Three weld beads are then deposited at the base of the J-groove.

Then, after the formation of the initial beads, between the deposition of each successive weld bead, almost immediately upon solidification of each bead, while each such bead is "red hot," each bead is hot peened by using an air or solenoid automatic hammer having a small rod with a ¼ inch square carbide type hammer end. The hot peening imparts a reduction of about 60 percent in the height of such weld beads, A sufficient number of beads are deposited such that the top of the resultant weld protrudes slightly above the outer surface of the formed strip as shown in FIG. 5.

Upon complete formation of the weld, the formed and welded strip is then annealed in a furnace at a temperature of about 982° C. for about 25 minutes in an air atmosphere. The formed and welded strip is then furnace cooled at a rate of 15° F. per minute to about room temperature. The formed and welded strip is then heated to a temperature of about 815° C. for about 15 minutes and then once again furnace cooled to room temperature.

After the completion of the heat treating cycle, the formed and welded strip is then machined along the outside diameter on a turret lathe such that the resultant machined strip is about 0.375 inches in thickness. Final hardness of the plating surface is a Knoop hardness number of about 300–375. This is a considerably greater hardness as compared to many prior art cathode drums which generally display a Knoop hardness number of about 200. This increased hardness results in a longer lasting drum cathode.

In summary, the above method renders a drum cathode suitable for use in a conventional metal foil producing operation or apparatus. Metal foil such as copper metal foil produced using such drum cathode results in the production of continuous foil having a uniform matte finish obviating the need to cut out sections of the foil formed in the area of the weld of the cathode. Thus, the drum cathode made in accordance with the teachings of the present invention is capable of producing metal foil of the same or improved type and quality as a prior art seamless or welded type cathode. However, a cathode made in accordance with the principles of the present invention costs considerably less than a seamless cathode and it exhibits better life than a prior art welded cathode. Thus, the costs associated with metal foil made using a drum cathode produced in accordance with the principles of the present invention are considerably reduced as compared to foils produced using prior art welded or seamless drum cathodes.

It will be appreciated that in addition to utilizing yttria as an addition agent in titanium metal the applicants also contemplate the use of other materials such as, for example, cerium oxide (ceria) $CeO_2$, zirconium oxide (zirconia) $ZrO_2$, lanthanum oxide (lanthana) $La_2O_3$, neodymium oxide (neodymia) $Nd_2O_3$, titanium boride ($TiB_2$) and titanium carbide (TIC). Additionally, it will be appreciated that the present invention contemplates the production of a drum cathode using more than one section of titanium metal and thus more than one weld. Further, it will be appreciated that the novel joining techniques disclosed herein are not limited to use in the production of cathodes. For example, such novel techniques may be used generally whenever there is a need to join together two or more pieces or sections comprising titanium wherein it is desired to have as little of a heat-affected zone as possible, such as, for example, in the production of parts for airplanes, missiles, spacecraft, etc. Also, in addition to joining sections of titanium metal, it will be appreciated that the teachings of the present invention may be used to repair a crack or groove found in a section of titanium metal.

Although the invention has been shown and described above with respect to specific embodiments, it is obvious that equivalent alterations and modifications will occur to others skilled in the art upon reading and understanding the specification. The present invention includes all such equivalent alterations and modifications, and is limited only by the scope of the following claims.

We claim:

1. A method of fabricating a drum cathode for use in producing electroformed metal foil comprising the steps of:
    A. providing a first section and a second section of titanium metal; and
    B. joining such first section of titanium metal to such second section of titanium metal to form a joined section of titanium metal utilizing a weld metal comprising titanium and an addition agent selected from the group consisting of yttria, ceria, zirconia, lanthana, neodymia, titanium boride and titanium carbide.

2. A method as set forth in claim 1 wherein such first section of titanium metal and such second section of titanium metal comprise a single piece of titanium metal, such single piece of titanium metal comprising titanium and yttria.

3. A method as set forth in claim 2 wherein such single piece of titanium metal comprises from about 0.001 weight percent to about 0.10 weight percent yttria.

4. A method as set forth in claim 2 wherein such single piece of titanium metal comprises from about 0.01 weight percent to about 0.07 weight percent yttria.

5. A method as set forth in claim 2 wherein such single piece of titanium metal comprises about 0.04 percent by weight ytrria.

6. A method as set forth in claim 1 wherein such weld metal comprises from about 0.001 weight percent to about 0.10 weight percent yttria.

7. A method as set forth in claim 1 wherein such weld metal comprises from about 0.01 weight percent to about 0.07 weight percent yttria.

8. A method as set forth in claim 1 wherein such weld metal comprises about 0.04 percent by weight yttria.

9. A method as set forth in claim 1 including the step of:
    C. heating at least a portion of such joined section of titanium metal.

10. A method as set forth in claim 9 wherein during said step C at least a portion of such joined section of titanium metal is heated to a temperature of from about 940° C. to about 1024° C. for a period of from about 5 minutes to about 60 minutes.

11. A method as set forth in claim 9 wherein during said step C at least a portion of such joined section of titanium metal is heated to a temperature of from about 968° C. to about 995° C. for a period from about 10 minutes to about 50 minutes 12. A method as set forth in claim 9 wherein during said step C at least a portion of such joined section of titanium metal is heated to a temperature of about 982° C. for a period of about 25 minutes.

13. A method as set forth in claim 9 including the steps of:
    D. cooling such joined section of titanium metal to about room temperature; and
    E. heating at least a portion of such joined section of titanium metal.

14. A method as set forth in claim 13 wherein during said step D such joined section of titanium metal is cooled to room temperature at the rate of about 5° C./minute.

15. A method as set forth in claim 13 wherein during said step E at least a portion of such joined section of titanium metal is heated at a temperature from about 774° C. to about 857° C. for from about 5 minutes to about 60 minutes.

16. A method as set forth in claim 13 wherein during said step E at least a portion of such joined section of titanium metal is heated at a temperature from about 788° C. to about 843° C. for about 10 to about 30 minutes.

17. A method as set forth in claim 13 wherein during said step E at least a portion of such joined section of titanium metal is heated at a temperature of about 815° C. for about 15 minutes.

18. A method as set forth in claim 1 wherein said joining step B comprises (i) depositing a bead of molten weld metal utilizing such weld metal; and (ii) hot peening such weld metal subsequent to solidification.

19. A method as set forth in claim 18 wherein during said hot peening step (ii) at least a 5 percent reduction in height is taken on such solidified weld metal while such solidified weld metal is at a temperature of from about 1450° C. to about 1670° C.

20. A method as set forth in claim 19 wherein during said hot peening step (ii) from about a 20 percent to about an 80 percent reduction in height is taken on such solidified weld metal while such solidified weld metal is at a temperature of from about 968° C. to about 995° C.

21. A method as set forth in claim 19 wherein during such hot peening step (ii) about a 60 percent reduction in height is taken on such solidified weld metal while such solidified weld metal is at a temperature of about 982° C.

22. A method of welding together two or more sections of titanium metal comprising the steps of:

A. providing a first and second section of titanium metal;

B. joining such first section of titanium metal to such second section of titanium metal to formed a joined section of titanium metal utilizing a weld metal by forming a bead of molten weld metal and hot peening such weld metal subsequent to the solidification while such solidified weld metal is substantially red hot; and C. subjecting such joined first and second section of titanium metal to a heat treating cycle, such heat treating cycle comprising a double anneal.

23. A method as set forth in claim 22 wherein such first and such second section of titanium metal comprise a single piece of titanium metal, and such single piece of titanium metal and such weld metal comprise an addition agent.

24. A method as set forth in claim 23 wherein such addition agent comprises yttrium.

* * * * *